United States Patent [19]

Langer

[11] Patent Number: 4,890,365
[45] Date of Patent: Jan. 2, 1990

[54] APPARATUS FOR HEATING FILM WEBS SIMULTANEOUSLY IN TWO AXIAL DIRECTIONS

[75] Inventor: Rudolf Langer, Lindau, Fed. Rep. of Germany

[73] Assignee: Lindauer Dornier Gesellschaft mbH, Lindau, Fed. Rep. of Germany

[21] Appl. No.: 195,725

[22] Filed: May 18, 1988

[30] Foreign Application Priority Data

May 18, 1987 [DE] Fed. Rep. of Germany ....... 3716603

[51] Int. Cl.$^4$ .............................................. D06C 3/00
[52] U.S. Cl. ........................................... 26/73; 26/91
[58] Field of Search ................................. 26/73, 91, 93

[56] References Cited

U.S. PATENT DOCUMENTS

| | | | |
|---|---|---|---|
| 2,755,533 | 7/1956 | Miller | 26/91 X |
| 3,150,433 | 9/1964 | Kampf | |
| 3,457,608 | 7/1979 | Gageur | 26/93 |
| 3,748,704 | 7/1973 | Schmidt et al. | 26/93 |
| 4,435,884 | 3/1984 | Bosch | 26/93 |
| 4,674,159 | 6/1987 | Sclater et al. | 26/93 |

FOREIGN PATENT DOCUMENTS

| | | |
|---|---|---|
| 1629562 | 7/1972 | Fed. Rep. of Germany . |
| 2841510 | 6/1980 | Fed. Rep. of Germany . |
| 3207384 | 2/1983 | Fed. Rep. of Germany . |
| 1337600 | 8/1963 | France ..................................... 26/73 |
| 4326117 | 11/1968 | Japan ....................................... 26/73 |
| 1495961 | 12/1977 | United Kingdom . |

Primary Examiner—Werner H. Schroeder
Assistant Examiner—Jodi Tokar
Attorney, Agent, or Firm—W. G. Fasse; D. H. Kane, Jr.

[57] ABSTRACT

An apparatus for simultaneously treating film webs biaxially is described. Film edges are clamped into tentering clamps running around in an endless track. The individual tentering clamps are interconnected with one another by an upper and a lower chain, whereby the connection between two successive tentering clamps is respectively established by two chain links loosely interconnected with each other. The loose chain links can be brought in pairs into a lengthwise extending arrangement or into a kinked arrangement and vice versa, with the aid of control rails arranged outside of the chain track cooperating with a chain link formed as a bellcrank. In this manner the spacing between two successive tentering clamps is shortened or alternatively lengthened. Thus, it is possible to achieve a lengthwise variation in the film web being treated, and especially to adjust a fine shrinking ratio.

7 Claims, 2 Drawing Sheets

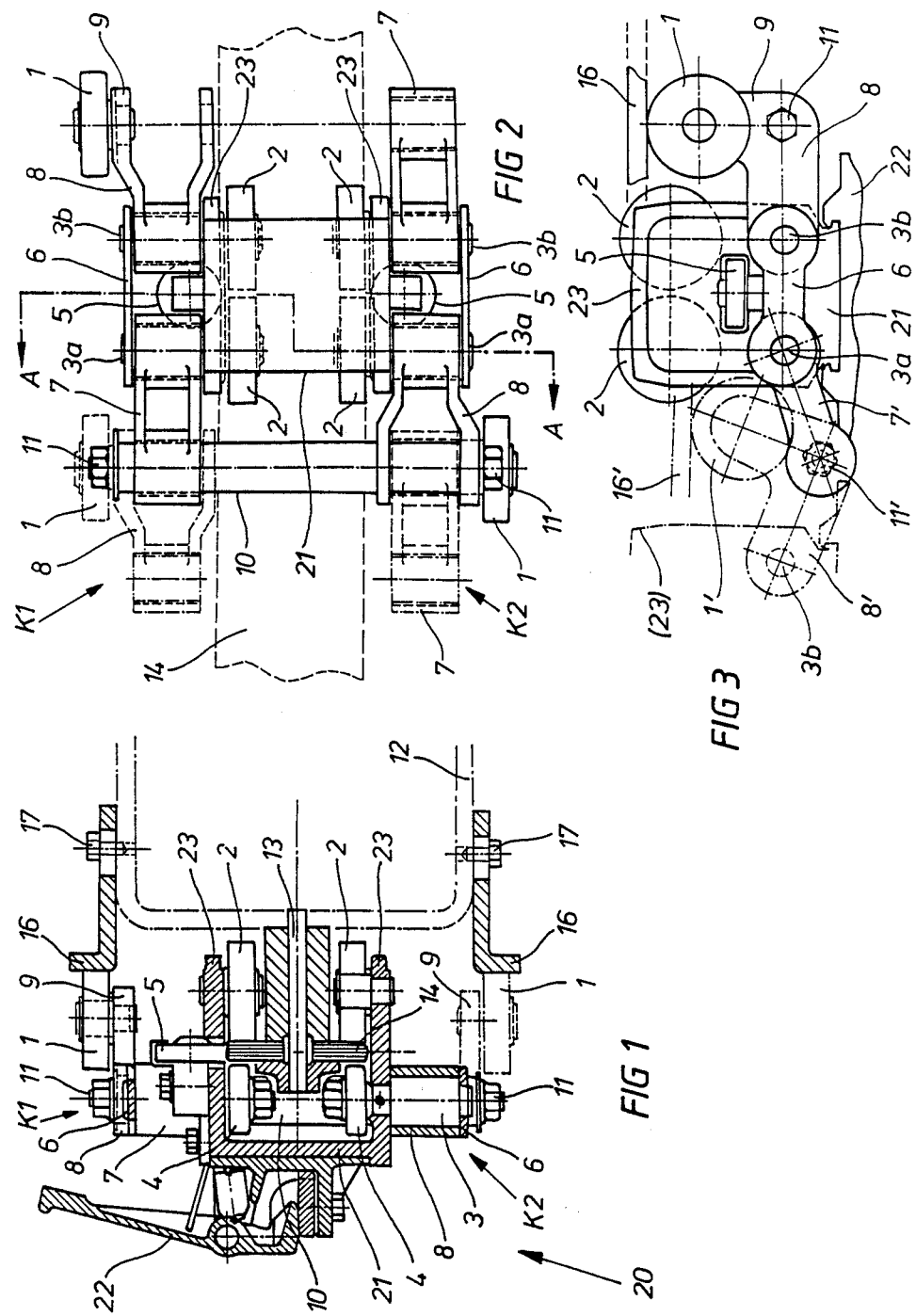

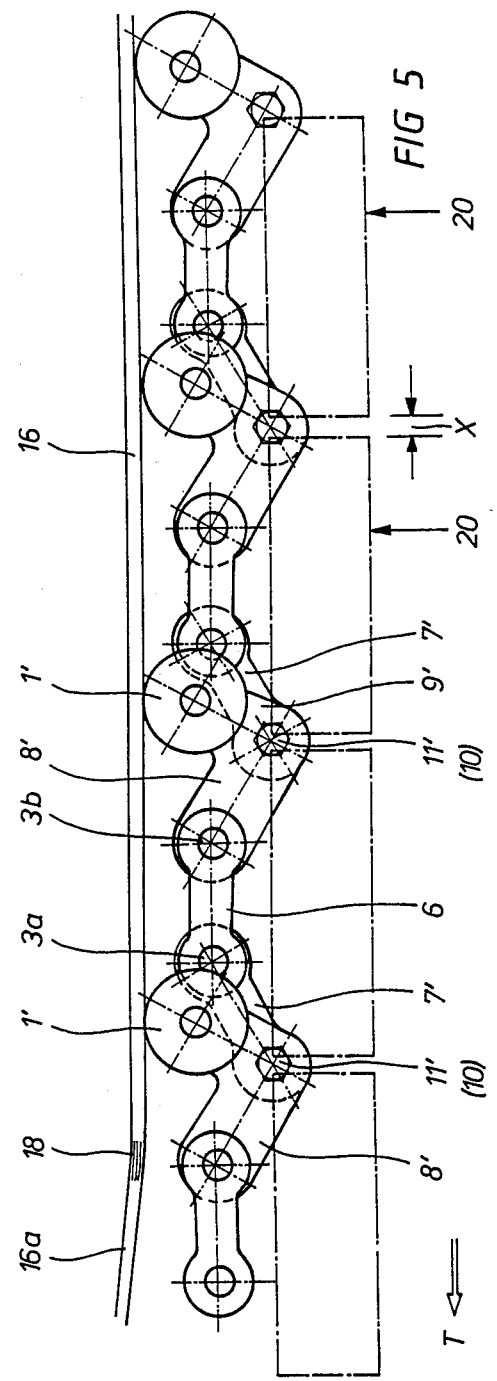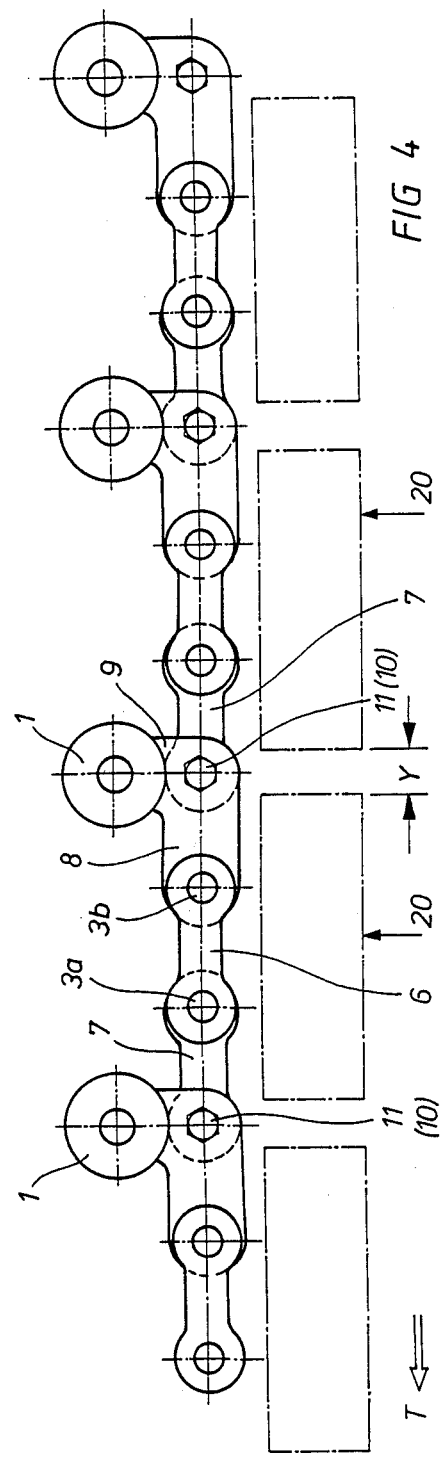

APPARATUS FOR HEATING FILM WEBS SIMULTANEOUSLY IN TWO AXIAL DIRECTIONS

FIELD OF THE INVENTION

The invention relates to an apparatus for a simultaneous biaxial treatment of film webs for stretching and/or shrinking such webs.

DESCRIPTION OF THE PRIOR ART

Such a treatment of film webs is typically carried out for the purpose of a film stretching or in the opposite sense for a controlled shrinking of a film web. A substantial number of devices based on various principles and constructions have already become known for this purpose. The essential fundamental idea behind all of these devices for simultaneous stretchings, is the consideration that the spacing between two tentering means for the film edges which run in an endless path, for example the spacing between two successive tentering clamps must be enlarged during operation and later must again be reduced along a return path. In this context machines ar known in which the tentering means for the film edge, for example tentering clamps, are combined into endlessly running tentering chains or alternatively, machines in which the tentering clamps are transported singly along their path.

For example, it is known from the German Patent Publication (DE-AS) 1,629,562 that two endless hinged conveyors with successive tentering means or gripping organs are respectively arranged along each edge of a film web. Here, the tentering means are respectively connected to each other by linking levers which are guided in a zig-zag shaped arrangement along two guide tracks in the stretching and fixing zone. The two guide tracks are arranged in the lengthwise direction relative to each other with a spacing which becomes increasingly larger in the stretching zone and a spacing which becomes increasingly smaller in the fixing zone. In this context it is disadvantageous and technically costly that a change of the lengthwise stretching ratio or the lengthwise shrinking ratio is only possible by means of a position change of the two paired guide tracks relative to one another. U.S. Pat. Publication (US-PS) 3,150,433 describes a film stretching machine in which tentering clamps are slideably arranged in endlessly running tracks along both edges of a film web. However, the tentering clamps are not consolidated into the chain, but instead are separately transportable and reach with a pin into a threading groove of a rotating shaft in a field which becomes wider in the transport direction. Due to the rotation of the shafts arranged respectively to the left and to the right of the film web, the tentering clamps are transported in the lengthwise direction. The two shafts extend diagonally apart in the transport direction and thereby achieve a transverse stretching of the film web. Moreover, the shafts are embodied in such a manner that the pitch of the threadng grooves increases in the transport direction, whereby the relative lengthwise spacing between the clamps is increased during the transport and a lengthwise stretching of the film is achieved. It is disadvantageous in this arrangement that the stretching ratio for the lengthwise stretching is fixed and cannot be varied. Moreover, the shafts are very costly and can only be applied for a limited straight distance in the forward running path of the clamps. A possibility of lengthwise shrinking is not disclosed in this publication.

German Patent Publication (DE-PS) 2,841,510 describes an apparatus for manufacturing a biaxially stretched film web wherein the separate tentering means are respectively connected with one another by cooperatively arranged tentering means. Each tentering means comprises a drum from which the respective connecting means may be reeled-off or onto which the connecting means may be rolled-up during the lengthwise stretching for varying the respective mutual spacing of the tentering means. In this context each drum is connected by a transmission with a chain sprocket which engages control drive chains arranged along the guide tracks of the tentering means. The drive chains are independent of the tentering means for reeling-off or rolling-up the connecting means. By appropriately activating the control drive chains, lengthwise stretching and also lengthwise shrinking ratios may be adjusted, depending on requirements. The disadvantages associated with such an arrangement, especially include the fact that the total lengthwise force is transmitted through all the connecting means which requires a considerable transmission expense and larger dimensions. Moreover, due to the unreeling and rolling-up onto the drums, the connecting means are continuously bent, whereby an increased weakening of the material and thereby an increased wear due to breaking and ripping off of the connecting means arises. Under some circumstances this is associated with a blocking of the tractor organ or rather the adjacently arranged tentering means or clamps in the guide tracks. Moreover, the arrangement of respectively one drum at each tentering means necessitates a not unconsiderable expenditure of space, material and hence weight.

A further development of the last above mentioned type of biaxial stretching machines is disclosed in the German Patent Publication (DE-PS) 3,207,384, wherein, the separate tentering clamps are no longer connected with each other by special rollable and unrollable means, but rather the tentering clamps are carried by a special endlessly running pulling member which transports these tentering clamps. Sprockets which are provided directly at the tentering clamps engage the pulling member and by means of their rotation they slide the tentering clamps along with the pulling member. The sprockets are driven by a drive mechanism, for example by electric motors or by transmissions which are respectively cooperatively arranged with the tentering clamps and which are externally controllable. The respective mutual spacing of the tentering clamps on the pulling member is thus adjustable by means of an independent control arranged externally to the pulling member. In this arrangement the lengthwise forces are only partially applied to each single tentering clamp and the major forces are transmitted through the pulling organ, which itself is not extensible and therefore may be easily constructed for the full loads arising as a result of the lengthwise forces. This known arrangement allows a simultaneous biaxial stretching with stretching or shrinking ratios controllable within wide limits, whereby the stretching or shrinking ratios can even comprise individually varying values along the treatment path. Said known arrangement has tentering clamps with roller bearing supports and therefore allows high running speeds with a smooth and shock free running operation. However, the known apparatus requires a not unconsiderable cost and effort for the control parts, transmissions, motors, etc. of which the installation on the clamps, or rather along the guide tracks, is often not easy to accomplish. This is especially so since these movable parts must be effective in the hot environment of the treatment zones within the housing. The control chains required in the known apparatus and arranged along the guide track to run at various speeds, are only accessible for maintenance with great difficulty.

In the tratment of film webs, not only does the stretching play an important role, as already mentioned, but the shrinking which occurs during the fixing process is also important. The spacings between the continuously running tentering clamps must be matched to the shrinking dimensions as exactly as possible during the shrinking of the film web. A precise adjustment of the shrinking dimension is not possible with the above described known apparatus.

OBJECT OF THE INVENTION

Starting from biaxial stretching machines of the last above mentioned type with roller bearing supported tentering clamps endlessly running around in guide tracks, it is the object of the invention to provide an apparatus for a simultaneous biaxial treatment of film webs, which avoids the installation of costly and sensitive auxiliary devices such as control chain drives, gears, motors, etc., but instead achieves a spacing variation between successive tentering clamps and therewith a lengthwise stretching in a simple and reliable manner and especially achieves a finely controlled lengthwise shrinkage.

SUMMARY OF THE INVENTION

According to the invention said object has been achieved by an apparatus for a simultaneous biaxial treatment of film webs, having roller bearing supported tentering means endlessly running around in guide tracks respectively at both edges of a film web and with clamping members for clamping the edges of the film web, whereby the spacing between the individual tentering means is externally influenceable by control members, wherein the tentering clamps are arranged in a row and interconnected with each other by means of tentering chains, whereby hinge joints of a first chain link are rigidly arranged on the tentering clamps and the connection of two successive tentering clamps between rigid hinge joints is achieved by two loosely interconnected chain links, and wherein with the aid of control means acting on a hinge bolt at the interconnection point, the loose chain links of the chain may be adjusted out of their longitudinally extending arrangement into an angled form which shortens the spacing between successive or neighboring tentering clamps.

The advantage of the apparatus according to the invention is seen in that it is of robust construction and does not have any sensitive parts. By means of the arrangement of two loosely interconnected chain links between the separate tentering clamps, the spacing between two successive or neighboring tentering clamps may be varied by kinking this interconnection of the two chain links or by a corresponding stretching. The kinking or stretching cf the chain links is achieved by means of a guide roller which presses against the hinge pin of the two chain links, whereby the guide roller is controlled by a control rail arranged along the guide track. This arrangement makes it possible by means of the construction of the control rail to adjust the ratio of the length variation depending on requirements. In this way it is possible to adjust various values of the stretching ratio in successive larger or smaller segments, especially also a fine dosing of the shrinking ratio is adjustable, whereby it is possible in intermediately located segments to interrupt the lengthwise stretching process, or it is possible to carry out a shrinking.

BRIEF DESCRIPTION OF THE DRAWINGS

An example embodiment of the invention is described below in conjuction with the drawings, wherein:

FIG. 1 shows a cross-section through a tentering chain track and a tentering clamp according to section line A—A of FIG. 2;

FIG. 2 shows a side view of a tentering chain in a greatly simplified manner;

FIG. 3 shows a similarly simplified top view;

FIG. 4 shows a chain strand in an extended state; and

FIG. 5 shows a chain strand in a shortened state.

DETAILED DESCRIPTION OF PREFERRED EXAMPLE EMBODIMENTS AND OF THE BEST MODE OF THE INVENTION

First, the complete construction of a tentering clamp according to the invention and its arrangement within a tentering chain will be described with reference to FIGS. 1 and 2. Here, a tentering clamp 20 with roller bearing supports for guiding the tentering clamp, is chosen as a tentering means for gripping the film web edges. An arrangement of a bendable guide rail 14 which is known as such, is provided for guidance, whereby the guide rail 14 is vertically arranged in a chain track carrier 12 by attaching means 13. The construction of the guide rails and tentering clamps above and below the clamping location of the guide rail 14 is essentially symmetrical. The tentering clamp 20 comprises a vertically arranged clamp body 21 with horizontal plates 23 forming a C-shape for grasping around, above and below, the guide rail 14. Moreover, a tentering element 22 which is not described in detail for clamping the film edge, is removably set onto the clamp body 21, for example, slid into place through grooves, compare FIG. 3. The manner of operation of the tentering element 22 is known and does not require further description. Here, the clamping plane for the film web advantageously lies in the plane of symmetry of the clamp member and the guide rail.

The upper and lower plates 23 carry two roller pairs 2 on their side facing away from the material web. Of the roller pairs 2 respectively one roller contacts and is guided by the upper part and the other roller contacts and is guided by the lower part of the guide rail 14. These running roller pairs 2 take up the horizontal transverse tentering forces during the treatment. A good load distribution is achieved by this symmetrical construction which is important for the variation of the clamp spacing according to the invention by means of a kinking of the chain stud links interconnecting the clamps. The running rollers 2 which are effective in the horizontal running plane and which are described here are rotatably attached to the plates 23 by means of pins or the like which are not described in detail. The plates 23 respectively comprise an opening which is not referenced. A support roller 5 reaches through the opening to run along the narrow edges of the guide rail 14 and becomes effective in a vertical running plane for taking up the arising vertical forces of the chain. A corresponding arrangement of a supporting roller 5 may also be provided in the lower plate 23. It acts as a counter roller to the upper support roller to prevent the tentering chain from being lifted away from the guide rail 14. On the side of the guide rail 14 facing toward the material web, two further pairs of rotationally supported rollers 4 with horizontal running planes are provided in the cover plates 23 of the clamp body 21. They are to act as counter rollers to the running rollers 2 to prevent the tentering chain from being lifted away from the guide rail 14 when the horizontal tentering forces are reduced or eliminated, and moreover they are to prevent a tipping of the entire tentering clamp 20 about its vertical support point at the support roller 5. The arrangement of the counter rollers 4 is analogous to the arrangement of the running rollers 2 as far as the running characteristics along the guide rail 14 are concerned. However, the bearing shafts cooperatively arranged for the counter rollers 4 carry a further shaft 3 on the outer side of the plates 23. The further shaft 3 serves as a hinge joint for connecting loose chain links. These loose chain links which are described in more detail below, establish the connection to the next tentering clamp.

In the simplified depiction of FIG. 2, one can see the clamp body 21 in the side view, whereby the tentering element 22 has been omitted. The horizontal plates 23 are seen as a termination at the upper and lower ends of the clamp body 21. Of the horizontally arranged rollers, only the four horizontal running rollers 2 which are arranged vertically in pairs one above the other, are shown. Their counter rollers 4 are not shown; they are located between the front wall of the clamp body 21 and the running rollers 2 in a similar horizontal arrangement.

Support rollers 5 run along the narrow edge of the guide rails 14 drawn with dashed lines.

FIG. 2 shows the fixed arrangement of two pairs of hinge pins 3 mounted vertically one above the other on the clamp body 21 or on its upper and lower plates 23. In order to better distinguish successive hinge pins they are referenced by 3a or 3b in the pulling or running direction of the tentering chain.

The two hinge pins 3a and 3b, the clamp body, and a lash-strap 6 interconnecting the two pin ends, form a rigid chain link. The hinge pins 3a or 3b serve as hinge joints for the loose chain links 7 or 8, whereby the loose chain links are respectively seated with their one end by means of a bushing on the corresponding hinge pin. The arrangement of the hinge pin 3 and of the bushing of a chain link 8 can be seen in the lower part of FIG. 1. This part of the Figure also shows the termination of the pin 3 by means of the chain lash-strap 6 which holds the bushing of the chain link 8 fixed o the pin 3.

The rigid chain link mentioned above formed by the clamp body 21 and by the lash-strap 6 and the two loose chain links 7 or 8 form the successive chain links of endlessly running chains. In this example embodiment two chains, namely an upper chain K1 and a lower chain K2 are provided. The loose chain links 7 or 8 which are attached to the rigid hinge pins 3a or 3b and a loose chain link of the neighboring tentering clamp form a two-linked articulated connecting link between two successive tentering clamps. Both loose chain links 7 and 8 comprise at their ends a bushing for bearing on a rigid hinge pin 3a or 3b. The chain link 7 is also embodied as a bushing at its other end, whereby the two bushings of the chain link 7 are completed as a closed chain link by means of two lash-straps with an opening located between the two straps. On the other hand, the chain link 8 similarly comprises two lash-straps extending from a bushing with free spacing located between the straps, but these straps are so arranged that they form a hinge joint by enclosing the loosely arranged bushing of the oppositely located chain link 7 at their ends. In order to achieve this, a hinge bolt 10 is provided which passes through from the chain K1 to the chain K2 and connects the two chains to each other in a similar manner as the above described clamp body 21. The attachment of the two chain links to the hinge bolt 10 is accomplished by screws 11. In this manner, all the chain hinge joints existing in one of the chains are rigidly connected to the correspondingly arranged joints of the other chain. The length dimension of the loose chain links 7 or 8 are all the same and correspond to the spacing of the two hinge pins 3a and 3b rigidly arranged on the clamp body 21. In this manner, a uniform chain pitch is achieved and the two chains K1 and K2 may be driven by chain sprockets in a conventional manner, whereby the chain sprockets may engage the above mentioned window like openings or interspaces of the chain links. The drive of the chains therefore need not be described in detail. The sequence of the loose chain links 7 or 8 in the pulling direction of the chain following the clamp body 21 may in principle be the same or the reverse for the upper chain K1 and for the lower chain K2. For example, in FIG. 2 a reverse sequence of the loose chain links is chosen for the lower chain K2.

In the greatly simplified top view of FIG. 3, the clamp body 21 with its upper plate 23 is recognizable. The vertical roller 5 reaches through an opening in the plate 23 in order to run along the narrow edge of the clamp guide rail 14 which is not shown. It is additionally shown in the lower part of FIG. 3 how a tentering element 22 may be secured to the clamp body 21 by being pushed into grooves. The position of the film web to be stretched is also defined by the indicated arrangement of the tentering element 22. As is typical, the film web lies on the side of the tentering element 22. The pins 3a and 3b are arranged between the vertical support roller 5 and the side of the clamp body 21 facing the film web, whereby however the covered counter rollers 4 for the running rollers 2, carried by the pins 3a and 3b, are not visible. A bushing of the loose chain link 7 is inserted in the parts of the pin 3a protruding upwardly above the plate 23 and a bushing of the loose chain link 8 is inserted into the corresponding pin 3b. The two inserted bushings are covered by a connecting lash-strap 6 reaching from the pin 3a to the pin 3b as is shown more clearly in FIG. 2. The hinge bolt 10 is arranged under a securing screw 11, but is not visible in FIG. 3. The outer web of the chain link 8 is embodied as an angle or bellcrank lever having an angled arm 9 extending from the securing screw 11 in the direction to the rear away from the material web and carrying a guide roller 1 at its end. The guide roller 1 is rotatably supported in a horizontal plane and rests against a control rail 16 of which only a short piece is shown in FIG. 3. FIG. 1 more clearly shows the arm 9 with its horizontal guide roller 1 extending away from the film web. This embodiment is provided in both chains K1 and K2. The arrangement of the control rail 16 is also shown in FIGS. 1 and 4, which is, for example, attached to a chain track carrier 12 so as to be adjustable or slideable in the direction perpendicular to the transport direction of the film web. The attachment is In the left part of FIG. 3 a shifted position 16' of the control rail 16 is shown by dash-dotted lines. As a result of this shifted control rail, the guide roller is also brought into a shifted position 1', whereby the angle lever of the chain link 8 is pivoted on the pin 3b sitting on the following tentering clamp and is brought into the position 8' shown by dash-dotted lines. The following tentering clamp is shown in a dash-dotted manner by the perimeter of its plate 23. Due to the pivoting of the chain link 8, the hinge bolt 10 indicated by its securing screw 11 moves into a position 11' and thereby also pivots the bushing of the adjacent chain link 7 which is supported on the hinge bolt 10 about its rigid hinge pin 3a into a pivoted position 7' Due to the kinked position of the loose chain links 7' and 7, 8 relative to the rigid hinge points of the pins 3a of one tentering clamp and 3b of the neighboring tentering clamp, the spacing between the last above named hinge pins 3a and 3b of the following tentering clamp is shortened. Because of the arrangement of the two chain strands K1 and K2 and due to their mutual interconnection by means of the through-going hinge bolts 10, the kinking of the chain links, or rather the variation of the clamp spacing is achieved in a uniform manner and without any tilting or pinching of the tentering clamps 20 on their guide rail 14.

In FIG. 4 a chain strand for tentering clamps 20 is shown in a schematic top view. The individual chain links are formed by a rigid chain link which comprises the tentering clamp and a lashing-strap 6 and two loose chain links 7 and 8 which establish the connection to the next tentering clamp. For the sake of simplicity in the following, the lashing-strap 6 shall represent the entire rigid chain link formed by the tentering clamp 20 itself. The position of the tentering clamps 20 is shown in a dash-dotted manner, whereby the guide rails 14 shown in FIG. 1 for the tentering clamps 20 have been omitted for the sake of clarity. Short dash-dotted line segments extending from the schematically shown tentering clamps 20 indicate the rigid arrangement of the hinge pins 3a and 3b on the tentering clamp 20. The lengths of the separate chain links 6, 7, and 8 are all the same and correspond to the spacing of the hinge pins 3a and 3b on a tentering clamp 20. In this manner all the hinge points of the chain strand have the same spacings, be they rigid hinge points such as at the pins 3a and 3b, or loose hinge points as at the hinge bolt 10, which is not visible here as it lies under the securing screw 11. For this reason a simple transport of the chain is possible by means of chain sprockets in a conventional manner. The transport direction is shown, for example, by the direction of the arrow T. In FIG. 4, a control rail 16 is not shown for the guide rail 1 so that the chain strand is uninfluenced by the control arrangement and is therefore maximally extended in the lengthwise direction, whereby a spacing (y) is formed between two successive tentering clamps 20.

FIG. 5 corresponds to the view of FIG. 4, with the difference that in FIG. 5 a control rail 16 is provided, whereby the guide rollers 1 must run along the control rail 16. The loose chain links 7 and 8 are pivoted into an angled position 7' and 8' in the manner described above with reference to FIG. 3 by means of the spacing of the control rail 16 from the stationary track of the tentering clamps 20, whereby a kinking of the chain links with their hinge bolts 10, shown by their securing screws 11, is achieved. As a result of this kinking or angling of the loose chain links, a shortening of the clamp spacing to the measure (x) is achieved. A fine and exact adjustment of the clamped spacing is made possible by the geometrically determined conditions of the kinking. In this manner a shrinking operation may be controlled in a fine, controlled manner during the biaxial treatment of film webs. In this context the absolute value of the shrinking ratio is naturally smaller than the otherwise typical lengthwise stretching ratios. Clearly, in an opposite sense a stretching operation or a post stretching operation of a small extent may also be carried out according to the invention.

Furthermore, it is assumed in FIG. 5 that the control rail 16 is divided into several successive sections 16, 16a. The sections have different positions of the control rail 16 relative to the stationary clamp track and thereby achieve different spacings between successive tentering clamps. In this manner, a varying lengthwise stretching ratio or lengthwise shrinking ratio is achieved in a sectionwise manner, whereby the stretching ratio itself is comparatively small, but on the other hand, may be finely adjusted for the shrinking operation. The transition between neighboring control rail sections 16 and 16a is not achieved in a jerky, stepwise manner at a kink location, but rather gradually for example, by means of an interposed transition member 18 which is made to be bendable in an analogous manner as the above described known guide rails 14 for the running rollers of the tentering clamps.

As shown in FIGS. 4 and 5, the journal axis of the hinge or journal bolt 10 is located at or passes through the intersection between the two arms 8 and 9 of the bellcrank lever which together with the other freely pivotable chain link 7 bridges the gap x, y between two neighboring tentering clamps 20.

Only the measures for controlling the spacings between two successive tentering clamps and thus for carrying out a treatment in the lengthwise direction, are described above. It is not necessary to further describe a simultaneous transverse stretching, that is, one which is carried out concurrently because it is achieved in a typical manner by means of tentering chain tracks which extend divergently.

Although the invention has been described with reference to specific example embodiments, it will be appreciated that it is intended to cover all modifications and equivalents within the scope of the appended claims.

I claim:

1. An apparatus for treating a film web simultaneously in two axial directions, comprising endless tentering chain means, including chain links and chain link journal shafts interconnecting said chain links, chain track means for supporting said endless tentering chain means along both edges of said film web, tentering clamps (20) for gripping a web edge, means for rigidly mounting said tentering clamps to said tentering chain means at a first spacing (y) between any two tentering clamps directly following each other in a row, and means for varying said spacing (y), said means for varying comprising, as part of said chain links, a pair of chain links for each of said tentering clamps, each pair of chain links including a first freely pivotable chain link (8) and a second freely pivotable chain link (7), and, as part of said journal shafts, a first journal shaft (3b) for pivotally connecting said first chain link (8) to one tentering clamp of said two tentering clamps, a second journal shaft (3a) for pivotally connecting said second chain link (7) to the other tentering clamp of said two tentering clamps, and a third journal shaft (10) for journalling said first and second chain links (8 and 7) to each other to bridge said first spacing (y), one of said first and second chain links forming a bellcrank lever having a chain link arm (8) and an angled lever arm (9) extending at an angle relative to a chain moving direction, said third journal shaft (10) passing through an intersection between said chain link arm (8) and said angled lever arm (9), said means for varying further comprising a guide roller (1) rotatably secured to a free end of said angled lever arm, and guide control track means (16) arranged for moving said guide roller (1) to position said first and second freely pivotable chain links (8,7) at an angle relative to each other, whereby said first spacing (y) is varied to a second spacing (x) depending on a distance between said guide control track means and said chain moving direction of said tentering chain means.

2. The apparatus of claim 1 wherein said tentering chain means comprise pairs of chains, each chain pair including an upper chain (KI) and a lower chain (K2) for interconnecting said tentering clamps, and wherein said third journal shaft comprises a hinge bolt (10) interconnecting said upper and lower chains to each other in a through-going manner for simultaneously journalling said first and second chain links (8 and 7) to each other.

3. The apparatus of claim 1 wherein said guide roller at said free end of sand angle lever arm of said bellcrank lever has a roller axis which is spaced from a journal axis of said third journal shaft (10).

4. The apparatus of claim 1, wherein said distance between said guide control track means and said chain moving direction of said tentering chain means, is variable.

5. The apparatus of claim 1, wherein said guide control track means comprise several separately adjustable guide track sections (16, 16a).

6. The apparatus of claim 5, further comprising flexible intermediate members (18) for interconnecting said guide control track sections (16, 16a) with each other.

7. The apparatus of claim 1, wherein said tentering clamps (20) comprise running rollers (2, 4) for taking up horizontal forces and support rollers (5) for taking up vertical forces, said chain track means including endless vertically arranged flexible guide rail means arranged for cooperation with said running rollers and with said support rollers, and wherein said tentering clamps (20) form a C-shape grasping around said guide rail means from a material web side.

* * * * *

UNITED STATES PATENT AND TRADEMARK OFFICE
CERTIFICATE OF CORRECTION

PATENT NO. : 4,890,365
DATED : January 2, 1990
INVENTOR(S) : Rudolf Langer

It is certified that error appears in the above-identified patent and that said Letters Patent is hereby corrected as shown below:

Title page:

Please replace [54], the Title, to read:

--APPARATUS FOR TREATING FILM WEBS SIMULTANEOUSLY IN TWO AXIAL DIRECTIONS--

Claim 3, Column 10, line 3, after "claim 1" insert --,--
Claim 3, Column 10, line 4, replace "sand" by --said--.

Signed and Sealed this

Nineteenth Day of February, 1991

Attest:

HARRY F. MANBECK, JR.

*Attesting Officer*    Commissioner of Patents and Trademarks